(12) United States Patent
Kim et al.

(10) Patent No.: US 10,133,785 B2
(45) Date of Patent: Nov. 20, 2018

(54) DATA STORAGE DEVICE INCLUDING INTERNAL HARDWARE FILTER AND DATA PROCESSING SYSTEM

(71) Applicant: SAMSUNG ELECTRONICS CO., LTD., Suwon-si, Gyeonggi-do (KR)

(72) Inventors: Kwang-Hoon Kim, Uiwang-si (KR); Man-Keun Seo, Hwaseong-si (KR); Sang-Kyoo Jeong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 373 days.

(21) Appl. No.: 14/979,796

(22) Filed: Dec. 28, 2015

(65) Prior Publication Data
US 2016/0196356 A1 Jul. 7, 2016

(30) Foreign Application Priority Data

Jan. 2, 2015 (KR) .......................... 10-2015-0000294

(51) Int. Cl.
G06F 17/30 (2006.01)

(52) U.S. Cl.
CPC .............................. G06F 17/30519 (2013.01)

(58) Field of Classification Search
CPC ................................................ G06F 17/30519
See application file for complete search history.

(56) References Cited

U.S. PATENT DOCUMENTS

| 6,947,930 | B2 | 9/2005 | Anick et al. |
| 7,546,284 | B1* | 6/2009 | Martinez ........... G06F 17/30336 |
| 7,853,759 | B2 | 12/2010 | Sadovsky et al. |
| 8,751,701 | B2 | 6/2014 | Shahar et al. |
| 2011/0047171 | A1 | 2/2011 | Paparizos et al. |
| 2012/0011127 | A1 | 1/2012 | Kim |
| 2012/0054420 | A1 | 3/2012 | Kang et al. |
| 2012/0137075 | A1* | 5/2012 | Vorbach ................... G06F 9/526 711/122 |
| 2013/0117286 | A1* | 5/2013 | Gallant ..................... G06F 7/24 707/752 |
| 2014/0337562 | A1* | 11/2014 | Long ..................... G06F 3/0659 711/103 |
| 2015/0149490 | A1 | 3/2015 | Kim et al. |

(Continued)

FOREIGN PATENT DOCUMENTS

| JP | 2004-126770 A | 4/2004 |
| KR | 10-2014-0048396 A | 4/2014 |
| KR | 10-2015-0061945 A | 6/2015 |

*Primary Examiner* — Syed H Hasan

(74) *Attorney, Agent, or Firm* — Volentine, Whitt & Francos, PLLC

(57) ABSTRACT

A data storage device includes a first memory device configured to provide first read data in response to a first read command, a controller including a hardware filter configured to generate first hint information based on a result of comparison of the first read data with filtering condition data and a processor configured to determine whether the first read data is to be filtered based on the first hint information, selectively filter the first read data based on the filtering condition data based on the determination result, and generate first filtered data, and a second memory device configured to store the first filtered data. The controller communicates the first filtered data to a host.

20 Claims, 16 Drawing Sheets

(56) References Cited

U.S. PATENT DOCUMENTS

2015/0186471 A1* 7/2015 Yammahi .......... G06F 17/30542
707/780
2015/0234602 A1* 8/2015 Seo .................. G06F 3/0611
710/308

* cited by examiner

FIG. 7

| |
|---|
| Partial matching indicator<br>  [a]: WHETHER START PORTION OF MKD IS INCLUDED<br>  [b]: WHETHER END PORTION OF MKD IS INCLUDED |
| Full matching indicator<br>  [c]: WHETHER WHOLE MKD IS INCLUDED |
| Partial matching-record indicator<br>  [d]: WHETHER DL IS PRESENT IN FRONT OF MKD<br>  [e]: WHETHER DL IS PRESENT BEHIND MKD |

⇨ HINT INFORMATION(HI) : [a][b][c][d][e]

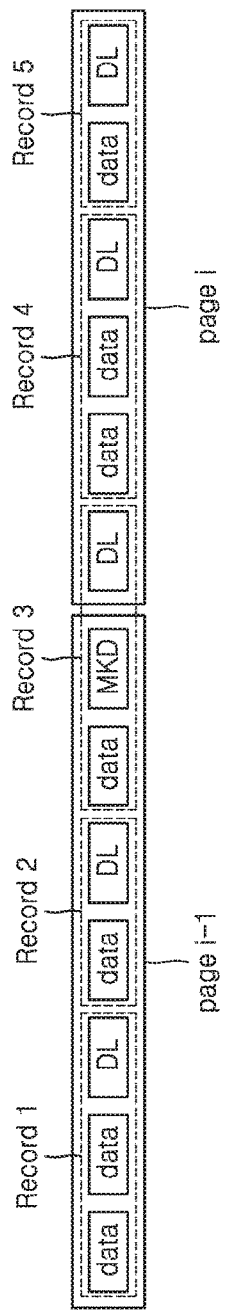
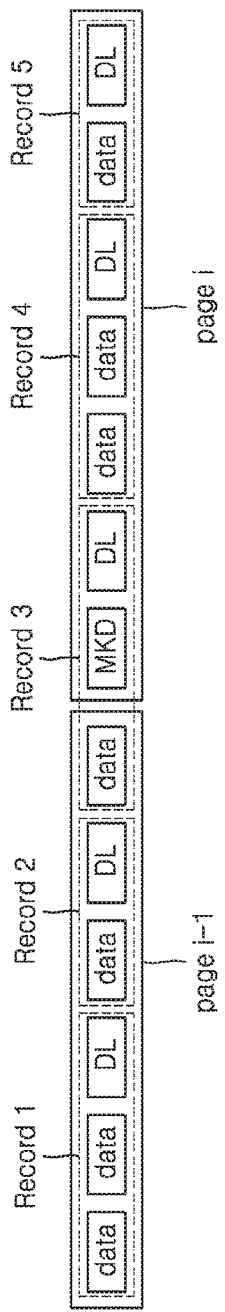

DATA STORAGE DEVICE INCLUDING INTERNAL HARDWARE FILTER AND DATA PROCESSING SYSTEM

CROSS-REFERENCE TO RELATED APPLICATION

This application claims the benefit of Korean Patent Application No. 10-2015-0000294 filed on Jan. 2, 2015, the disclosure of which is hereby incorporated by reference.

BACKGROUND

The inventive concept relates generally to data storage devices and methods of operating same. More particularly, the inventive concept relates to data storage devices including a hardware filter and methods of operating such data storage devices. Certain embodiments of the inventive concept provide data storage device and systems including one or more data storage devices capable of reducing overall data traffic as well as related methods of operation.

In a typical data server system including a server and a database, so-called "big data" may be stored in a relational database or a Not-only Structured Query Language (NoSQL) database. Desired data may be extracted from the big data stored in the relational database or NoSQL database using an SQL and/or a unique query language. During the extraction of desired data, portions (i.e., some or all) of the big data is usually communicated from the database to a primary memory associated with the server. One or more processor(s) associated with the server may then be used to extract desired data from the big data portion stored in the primary memory. However, since only a portion of the big data is stored in the primary memory, methods used to extract desired data from the big data may lead to inefficiencies in data traffic between the database and the primary memory.

SUMMARY

The inventive concept provides a data storage device including a hardware filter to reduce data traffic communicated from a database, which is used as a secondary memory device, to a primary memory, a method of operating the data storage device, and a system including the data storage device.

According to an aspect of the inventive concept, there is provided a data storage device including a first memory device configured to provide first read data in response to a first read command, a second memory device configured to store the first read data, and a controller configured to generate first hint information based on a result of comparison of the first read data with filtering condition data, determine whether a filtering operation is to be performed on the first read data based on the first hint information, and perform a selective filtering operation on the first read data based on the filtering condition data. First filtered data obtained as a result of the selective filtering operation is communicated to a host.

The controller includes a first processor configured to generate a control signal based on a filtering command provide by the host, and a second processor configured to generate the filtering condition data based on the control signal.

The controller may include a processor including a software filter configured to perform the selective filtering operation.

The first memory device may be a non-volatile memory device, and the second memory device may be a volatile memory device.

The controller may generate the first hint information based on whether the first read data includes matching key data included in the first condition data.

The first hint information may include an address value of the matching key data included in the first read data.

The controller may filter the first read data when the first read data receives the first hint information indicating that the first read data includes all or some of the matching key data. The controller may not filter the first read data when the first read data receives the first hint information indicating that the first read data does not include all or some of the matching key data.

The controller may include a hardware filter configured to generate first hint information based on a comparison of the first read data with the filtering condition data. The hardware filter may include a register configured to store the matching key data, a comparator configured to compare the matching key data provide by the register with the first read data and generate a comparison signal, and a hint generator configured to generate the first hint information indicating that the first read data includes the matching key data, in response to the comparison signal.

The processor may generate the filtering condition data based on a query provide by a host and program the filtering condition data in the hardware filter.

The query may be a structured query language (SQL) or a unique query language.

The first memory device may provide second read data in response to a second read command. The controller may generate second hint information based on a result of comparison of the second read data with the filtering condition data, and perform a selective filtering operation on the second read data based on the filtering condition data based on the second hint information. The controller may communicate second filtered data obtained as a result of the selective filtering operation to the host.

The first memory device may be a non-volatile memory device. The first read data and the second read data may be page units of data.

According to another aspect of the inventive concept, there is provided a data processing system including a host configured to provide a read command and a filtering command, a first memory device configured to provide first read data and second read data in response to the read command, a second memory device configured to store the first read data and the second read data, and a controller comprising a hardware filter configured to compare the first read data and the second read data with filtering condition data and generate first hint information and second hint information, respectively, and a processor configured to perform a selective filtering operation on the first read data and the second read data based on the filtering condition data. Filtered data obtained as a result of the selective filtering operation is communicated to the host.

The first memory device may be a flash memory device. The first read data may be stored in an n-th page of the first memory device, and the second read data may be stored in an (n+1)-th page of the first memory device.

The filtering condition data may include matching key data. The hardware filter may generate the first hint information indicating whether the first read data includes first matching key data, which is part of the matching key data, and generate the second hint information indicating whether the second read data includes second matching key data, which is part of the matching key data. The processor may perform a filtering operation on the first read data and the second read data simultaneously based on the first hint information and the second hint information.

According to another aspect of the inventive concept, there is provided a method of operating a data processing system including a host and a data storage device. The method includes; setting filtering condition data including matching key data in the data storage device, issuing a read command, in response to the read command, providing read data from a secondary memory of the data storage device to a primary memory of the data storage device, generating hint information in response to a comparison between the filtering condition data and the read data, in response to the hint information, generating filtered read data by performing a filtering operation on the read data, only if the read data includes at least a portion of the matching key data, and storing the filtered read data in the primary memory, and communicating the filtered read data to the host.

The setting of the filtering condition data may be performed in response to a filtering command issued by the host.

The filtering command may include at least one of a data access command and a query requesting desired data from a database.

The primary memory may include at least one non-volatile memory device and the secondary memory may include at least one volatile memory device.

The method may further include issuing a filtering command from the host, wherein the data storage device comprises a first processor that generates a control signal in response to the filtering command, and a second processor that generates the filtering condition data in response to the control signal.

BRIEF DESCRIPTION OF THE DRAWINGS

Exemplary embodiments of the inventive concept will be more clearly understood from the following detailed description taken in conjunction with the accompanying drawings in which:

FIG. 7 is a listing illustrating one possible format for hint information including a bitmap according to an exemplary embodiment;

FIGS. 8A, 8B, 8C and 8D are respective diagrams illustrating possible hint information relative to configuration of read data in the context of Table 1;

DETAILED DESCRIPTION OF THE EMBODIMENTS

Figure 1:
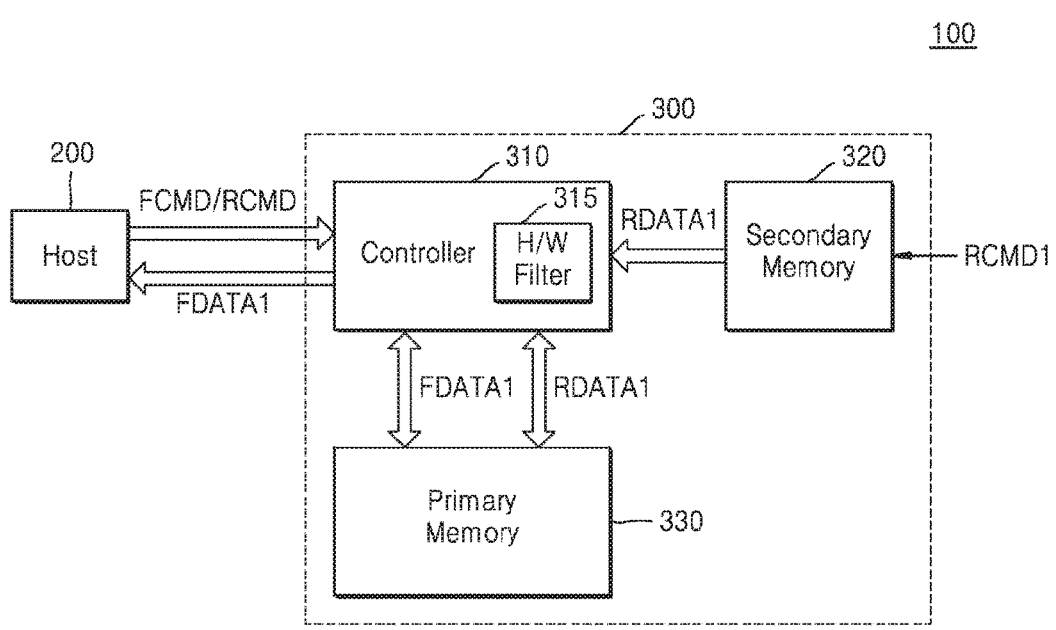
FIG. 1 is a block diagram illustrating a data processing system according to an exemplary embodiment.

The present inventive concept will now be described more fully with reference to the accompanying drawings in which embodiments of the inventive concept are shown. However, the inventive concept is not limited thereto and it will be understood to encompass various changes in form and detail without departing from the scope of the following claims. That is, descriptions on particular structures or functions may be presented merely for explaining exemplary embodiments of the present inventive concept. Throughout the drawings, like reference numerals denote like elements. Sizes of components in the drawings may be exaggerated for convenience of explanation.

Terms used in the present specification are used for explaining a specific exemplary embodiment, not for limiting the present inventive concept. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Terms such as "first" and "second" are used herein merely to describe a variety of constituent elements, but the constituent elements are not limited by the terms. Such terms are used only for the purpose of distinguishing one constituent element from another constituent element. For example, without departing from the scope of the present inventive concept, a first constituent element may be referred to as a second constituent element, and vice versa.

Unless defined otherwise, all terms used herein including technical or scientific terms have the same meanings as those generally understood by those of ordinary skill in the art to which the present inventive concept may pertain. The terms as those defined in generally used dictionaries are construed to have meanings matching those in the context of the related technology and, unless clearly defined otherwise, are not construed to be ideally or excessively formal.

As used herein, the term "and/or" includes any and all combinations of one or more of the associated listed items.

FIG. 1 is a block diagram of a data processing system 100 according to an exemplary embodiment.

Referring to FIG. 1, the data processing system 100 generally includes a host 200 and a data storage device 300. The data processing system 100 may refer to a database management system (DBMS) or a relational DBMS (RDBMS). The DBMS may include a column-oriented DBMS or a row-oriented DBMS. Contemporarily known DBMS include, for example, MySQL, PostgreSQL, SQLite, Microsoft SQL Server, Microsoft Access, Oracle, SAP, dBASE, FoxPro, IBM DB2, and FilemakerPro. The host 200 controls the overall operation of the data storage device 300, whereby the data storage device 300 may execute a plurality of operations such as a write operation, a read operation, or a filtering operation. In certain embodiments, the host 200 and data storage device 300 may communicate or exchange data via the serial advance technology attachment (SATA), serial attached SCSI (SAS), or peripheral component interconnect express (PCIe), etc.

The data storage device 300 of FIG. 1 includes a controller 310, a secondary memory device 320, and a primary memory device 330. The data storage device 300 may be embodied by an all-in-one data storage device. For example, the data storage device 300 may be embodied by a solid-state drive (SSD), an embedded SSD (eSSD), a hard disc drive (HDD). Accordingly, when the data storage device 300 is embodied by an SSD or an eSSD, the data processing system 100 may be embodied by a data processing system including an SSD or an eSSD.

The secondary memory device 320 may be used to provide first read data RDATA1 to a hardware filter 315 included in the controller 310 in response to a first read command RCMD1. The first read data RDATA1 may be big data (or a designated portion of big data stored in a database external to the data storage device 300). In this regard, the secondary memory device 320 serves as (or functions as) a database. The secondary memory device 320 may include non-volatile memory cells, such as those provided by electrically erasable programmable read-only memory (EEPROM), flash memory, magnetic random access memory (MRAM), spin-transfer torque MRAM (STT-MRAM), conductive bridging RAM (CBRAM), ferroelectric RAM (FeRAM), phase-change RAM (PRAM), resistive RAM (RRAM), nanotube RRAM), polymer RAM (PoRAM), nano floating gate memory (NFGM), a holographic memory, a molecular electronics memory device, or an insulator resistance change memory. In certain embodiments, the secondary memory device 320 may be embodied by a NAND flash array or a NOR flash array.

The hardware filter 315 compares the first read data RDATA1 with filtering condition data FCD in order to generate first hint information based on the comparison result. In one exemplary embodiment, the filtering condition data FCD may be generated based on a filtering command FCMD provided by the host 200. The filtering command FCMD may include various commands and/or queries to request information from the database. The filtering condition data FCD may include matching key data associated with certain desired data identified by a user (e.g., a person or an external digital data system). The first hint information may indicate whether the first read data RDATA1 includes the matching key data. In one exemplary embodiment, when the first hint information includes the matching key data, the first hint information may have a value '1', which is a bit unit of data. When the first hint information does not include the matching key data, the first hint information may have a value '0'.

Under this working assumption, when the first hint information has a value '1', the controller 310 may determine that the first read data RDATA1 is target data on which a filtering operation should be performed. Thus, in response to the first hint information, a filtering operation based on given filtering condition data FCD will be performed on the first read data RADATA1. That is, a selective filtering operation may be performed on the first read data RDATA1 based on the first hint information. As a result, first filtered data FDATA1 may be provided to the host 200 and primary memory device 330 via a data bus (not shown).

In contrast, when the first hint information has a value '0', the controller 310 may determine that the first read data RDATA1 is not target data on which the filtering operation should be performed. Thus, the first hint information may be generated depending on whether the matching key data is identified in (or included in) the first read data RDATA1, and the selective filtering operation may be performed on the first read data RDATA1 based on the first hint information. Thus, data required to perform the filtering operation may be reduced to reduce data traffic. Furthermore, the first hint information may further include an address value of the matching key data included in the first read data RDATA1 as offset data.

When the data storage device 300 is embodied by an SSD and the secondary memory device 320 is embodied by a NAND flash memory, the hardware filter 315 may be embodied close to the NAND flash memory so that data traffic associated with the SSD may be reduced. Also, the secondary memory device 320 may provide the first read data RDATA1 to the controller 310 in response to the first read command RCMD1. The secondary memory device 320 may be a NAND flash memory including a plurality of page frames, and the first read data RDATA1 may defined in page units of data. Accordingly, second read data RDATA2, later described, may be defined in page units of data, and the secondary memory device 320 may provide the first read data RDATA1 to the controller 310 in response to the first read command RCMD1, and provide the second read data RDATA2 to the controller 310 in response to a second read command. Those skilled in the art will recognize that the scope of the inventive concept is not limited to only the foregoing assumptions. For example, the secondary memory device 310 may provide a larger amount of read data than described above in response to respective read commands.

The primary memory device 330 may be embodied by a dynamic random access memory (DRAM), a static random access memory (SRAM), a thyristor RAM (T-RAM), a zero capacitor RAM (Z-RAM), or a twin transistor RAM (TTRAM). The host 200 and the data storage device 300 may communicate (i.e., transmit and/or receive) data and/or commands via the controller 310. The controller 310 may communicate first filtered data FDATA1 via one or more signal line(s) (hereafter, "signal line" whether one or more, and whether embodied as electrical and/or optical lines).

Figure 2:
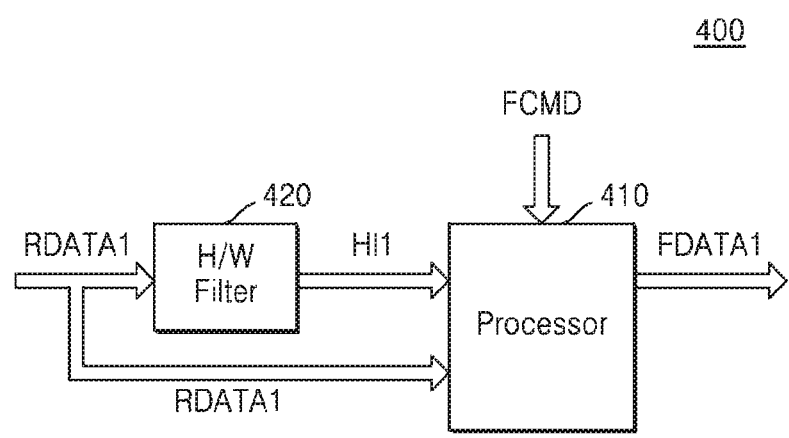
FIG. 2 is a block diagram illustrating a controller according to an exemplary embodiment.

FIG. 2 is a block diagram illustrating a controller 400 according to an exemplary embodiment.

Referring to FIG. 2, the controller 400 includes a processor 410 and a hardware filter 420. The hardware filter 420 receives first read data RDATA1, compares filtering condition data FCD with the first read data RDATA1, and in response, generates first hint information HI1. In one exemplary embodiment, the first hint information HI1 may include one or more data bit indicating whether the first read data RDATA1 includes matching key data defined by the filtering condition data FCD.

The processor 410 receives the first hint information HI1 from the hardware filter 420 as well as the first read data RDATA1 from the secondary memory device 320 shown in FIG. 1. The processor 410 may then determine whether a filtering operation should be performed on the first read data RDATA1 based on the first hint information HI1. For example, when the first read data RDATA1 includes the matching key data defined by the filtering condition data FCD, a filtering operation is performed on the first read data RDATA1. However, when the first read data RDATA1 does not include the matching key data, the filtering operation is not performed on the first read data RDATA1.

Thus, the processor 410 may receive a filtering command FCMD (e.g., from the host 200 of FIG. 1 or another digital data platform external to the controller 400) and generate filtering condition data FCD based on the filtering command FCMD. Firmware executed by the processor 410 or an application program may be set or programmed in the hardware filter 420 via an application programming interface (API). The firmware, API and/or application may be loaded from the secondary memory device 320 (or some other non-volatile memory accessible by the controller 400) to the primary memory device 330, and thereafter executed by the processor 410. Thus, the processor 410 is able to filter the first read data RDATA1 based on the filtering condition data FCD provided by a host in order to generate first filtered data FDATA1.

With reference to FOGS. 1 and 2, the controller 400 may further include a memory controller (not shown) configured to control the primary memory device 330. The first filtered data FDATA1 generated by the processor 410 may be stored in the primary memory device 330 via the memory controller. Also, the first read data RDATA1 stored in the primary memory device 330 may be read via the memory controller.

Figure 3:
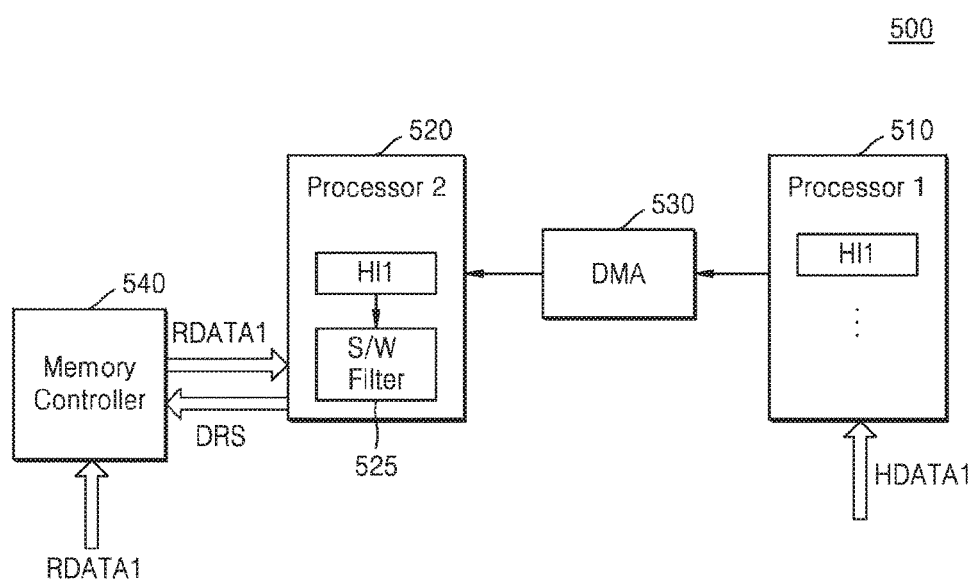
FIG. 3 is a block diagram further illustrating a processor according to an exemplary embodiment.

FIG. 3 is a block diagram illustrating a processor 500 according to an exemplary embodiment.

Referring to FIG. 3, the processor 500 includes a first processor 510, a second processor 520, a direct memory access (DMA) 530, and a memory controller 540. In response to a filtering command FCMD received from a host, the first processor 510 generates a control signal that causes the generation of the filtering condition data FCD. That is, the second processor 520 may generate filtering condition data FCD in response to the control signal provided by the first processor 510.

Hence, the first processor 510 may control generation of the first hint information HI1 by the hardware filter 420 of FIG. 2, and receive the first hint information HI1. The first hint information HI1 may be related to the first read data RDATA1 and generated based on a result of comparison of the first read data RDATA1 with the filtering condition data FCD. As previously noted, the filtering condition data FCD may include matching key data, and the first hint information HI1 may indicate whether the first read data RDATA1 includes the matching key data.

The first read data RDATA1 may be provide in response to a first read command from the host, and the first hint information HI1 may be stored in a register of the first processor 510. The first hint information HI1 stored in the first processor 510 may be provided to the second processor 520. In this case, the DMA 530 may provide the first hint information HI1 to the second processor 520 without additional commands from a processor or host. The second processor 520 may include a register capable of storing hint information received from the first processor 510. A software filter 525 may selectively filter portions of read data based on the received hint information.

Referring to FIGS. 1, 2 and 3, the memory controller 540 may control the primary memory device 330. The memory controller 540 may receive first read data RDATA1 from the secondary memory device 320, and store the first read data RDATA1 in the primary memory device 330.

In one exemplary embodiment, when the second processor 520 receives the first hint information HI1 from the first processor 510, where the first hint information HI1 indicates that the first read data RDATA1 includes matching key data desired by a user, the second processor 520 may provide a data request signal DRS requesting the first read data RDATA1 to the memory controller 540 based on the first hint information HI1. In response to the data request signal DRS, the memory controller 540 provides the first read data RDATA1 to the second processor 520, and the second processor 520 may perform a filtering operation on the first read data RDATA1 based on the filtering condition data FCD.

When the first hint information HI1 indicates that the first read data RDATA1 does not include the matching key data, the second processor 520 will not request the first read data RDATA1 from the memory controller 540 based on the first hint information HI1. Thus, the second processor 520 need not perform the filtering operation on the first read data RDATA1.

In the above-described method, the second processor 520 may receive second hint information HI2 and/or third hint information HI3 generated by the hardware filter 420 and communicated via the first processor 510. Such further hint information (i.e., hint information different and additional to the first hot information) may be used to selectively filter second read data RDATA2, third read data RDATA3, etc. Thus, data traffic may be reduced during a filtering operation as compared with conventional approaches. In one exemplary embodiment, the first processor 510 and second processor 520 may be embodied by a single computational block (e.g., hardware, firmware and/or software) so that a single computational block may be used to perform filtering operation(s) without the requirement of communicating hint information between separate processors.

Figure 4:
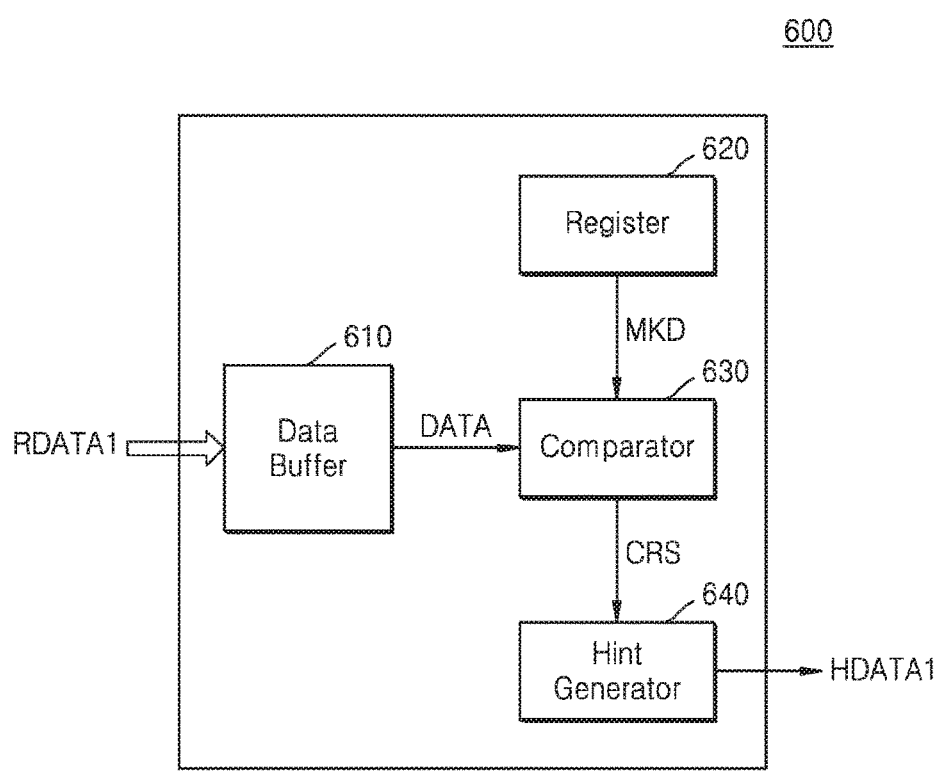
FIG. 4 is a block diagram illustrating a hardware filter according to an exemplary embodiment.

FIG. 4 is a block diagram illustrating a hardware filter 600 according to an exemplary embodiment.

Referring to FIG. 4, the hardware filter 600 includes a data buffer 610, a register 620, comparators 630, and a hint generator 640. The data buffer 610 may receive and store first read data RDATA1, which may include meta data MDATA and normal data DATA (i.e., data other than meta data MDATA). The data buffer 610 may provide the normal data DATA to the comparators 630. Alternately, when the data buffer 610 receives read data other than the first read data RDATA1, the normal data DATA may include this other read data. The register 620 may be used to store filtering condition data FCD. Furthermore, the register 620 may store matching key data MKD included in the filtering condition data FCD. For example, the register 620 may be embodied by an SRAM that may function as a buffer. The comparators 630 may be used to compare the matching key data MKD provide by the register 620 with the normal data DATA included in the first read data RDATA1 in order to generate a comparison result CRS based on the comparison result. The hint generator 640 may generate first hint information HI1 and provide the first hint information HI1 based on the comparison signal CRS.

Figure 5:
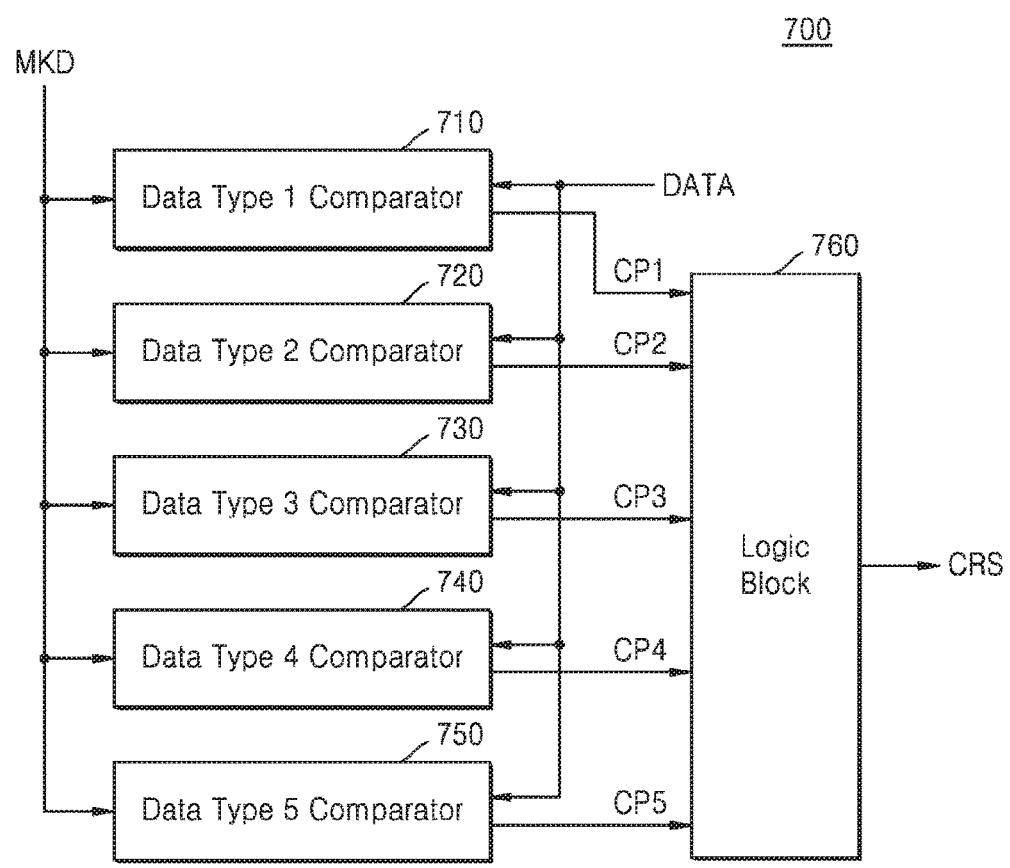
FIG. 5 is a block diagram illustrating a comparator according to an exemplary embodiment.

FIG. 5 is a block diagram illustrating comparators 700 according to an exemplary embodiment.

Referring to FIG. 5, the comparators 700 include a plurality of data-type comparators 710, 720, 730, 740 and 750 (collectively, "710 to 750"), as well as a logic block 760. The data-type comparators 710 to 750 may be used to compare matching key data MKD with normal data DATA included in the read data received by the data buffer 610 of FIG. 4, and generate respective comparison signals CP1, CP2, CP3, CP4 and CP5 (collectively, "CP1 to CP5"), based on comparison results. In this regard, "data types" may be types for classifying various data. For example, the data types may include integers, Boolean values, characters, floating-point numbers, and alphanumeric strings.

A first data-type comparator 710 may compare integers, which may mean matching key data MKD and normal data DATA. A second data-type comparator 720 may compare Boolean values, which may mean matching key data MKD and normal data DATA. A third data-type comparator 730 may compare characters, which may mean matching key data MKD and normal data DATA. A fourth data-type comparator 740 may compare floating-point numbers, which may mean matching key data MKD and normal data DATA. A fifth data-type comparator 750 may compare alphanumeric strings, which may mean matching key data MKD and normal data DATA. The logic block 760 may perform one or more logical operation(s) on the comparison signals CP1 to CP5 in order to generate one or more comparison signals CRS. For example, the logic block 760 may be embodied by an XOR gate.

Although FIG. 5 illustrates the use of only five (5) comparators 710 to 750 for sake of brevity, the scope of the inventive concept is not limited thereto. Accordingly, any reasonable number of comparator(s) of various data types may be used to embody the comparators 700 in different embodiments of the inventive concept.

Figure 6:
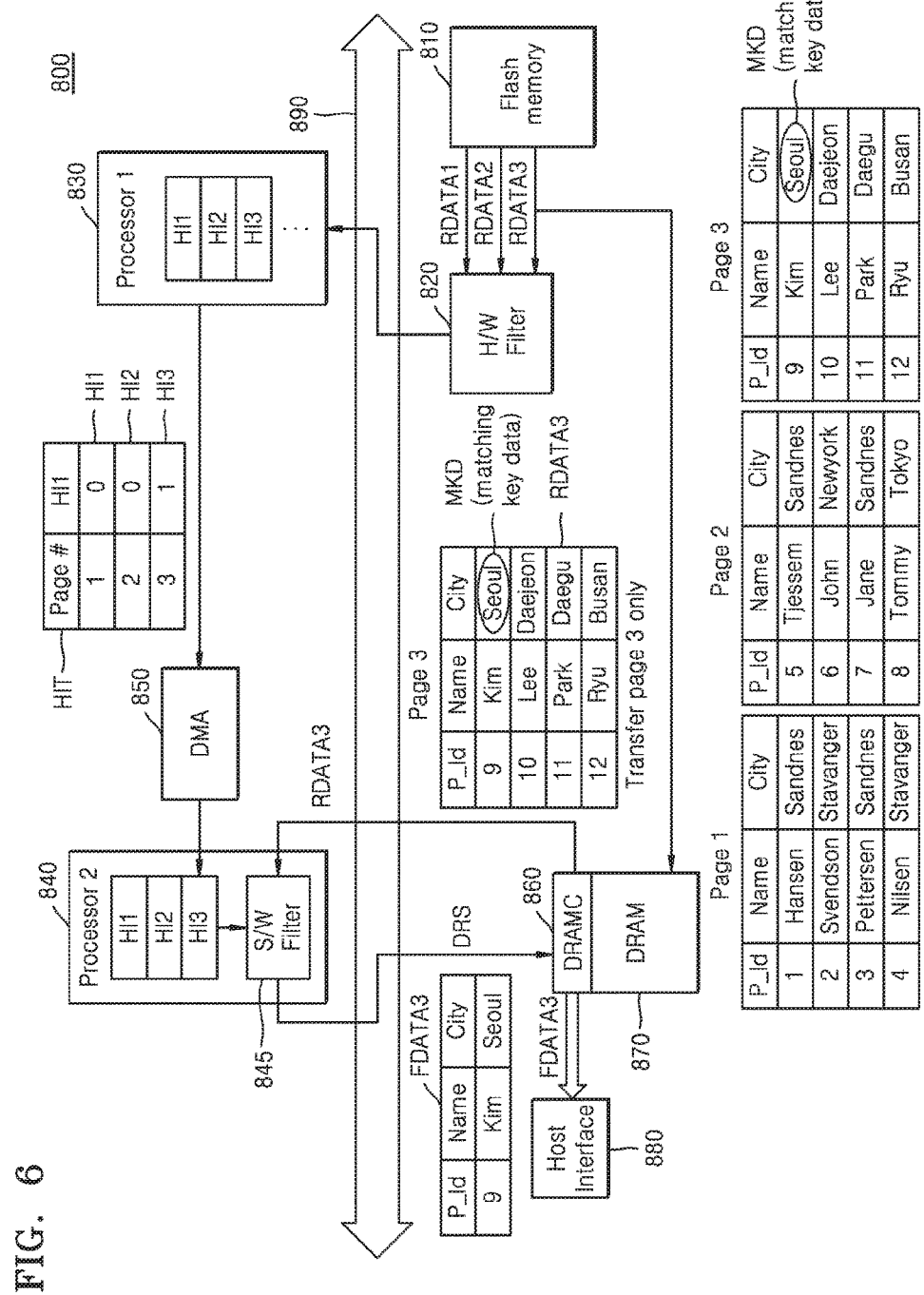
FIG. 6 is a conceptual diagram illustrating operation of a data processing system according to an exemplary embodiment.

FIG. 6 is a conceptual diagram illustrating operation of a data processing system 800 according to an exemplary embodiment.

Referring to FIG. 6, the data processing system 800 includes a flash memory 810 serving as a secondary memory device, a hardware filter 820, a first processor 830, a second processor 840, a DMA 850, a memory controller 860, a DRAM 870 serving as a primary memory device, a host interface 880, and a data bus 890.

The flash memory 810 may be used to provide first read data RDATA1, second read data RDATA2, and third read data RDATA3 to the hardware filter 820 in response to a read command from the host interface 880. Also, the first, second and third read data RDATA1, RDATA2, and RDATA3 (collectively, "RDATA1 to RDATA3") may be stored in the DRAM 870 by the memory controller 860. The data read unit may be a page unit, where in the illustrated working example, the first, second and third read data RDATA1 to RDATA3 are corresponding page units (Page1, Page2 and Page3). Here, first, second and third pages (collectively, "Page1 to Page3") shown in FIG. 6 in table form (or in a table data type) is stored data capable of being processed using a structured query language (SQL).

Column names P_id, Name, and City identify respective column lists, where 'Kim', 'Seoul', etc., are column operator values in the illustrated example.

The hardware filter 820 receives first, second and third read data RDATA1 to RDATA3 and generates corresponding first, second and third hint information HI1 to HI3. Referring to a first page corresponding to the first read data RDATA1, a second page corresponding to the second read data RDATA2, and a third page corresponding to the third read data RDATA3, the respective pages may include row data Row DATA corresponding to the column names P_id, Name, and City. The host interface 880 may provide a filtering command FCMD, and generate filtering condition data FCD based on the filtering command FCMD. The filtering condition data FCD may include matching key data MKD that is desired by a user, and the matching key data MKD may be "Seoul".

The hardware filter 820 may compare row data of the first page Page1 corresponding to the first read data RDATA1 with data "Seoul" that is the matching key data MKD. In one exemplary embodiment, the first page Page1 may not include the data "Seoul", and the hardware filter 820 accordingly generates first hint information HI1 based on the comparison result. The hardware filter 820 compares row data of the second page Page2 corresponding to the second read data RDATA2 with the data "Seoul" that is the matching key data MKD. The second page Page2 does not include the data "Seoul", and the hardware filter 820 accordingly generates second hint information HI2 based on the comparison result. The hardware filter 820 also compares row data of the third page Page3 corresponding to the third read data RDATA3 with the data "Seoul" that is the matching key data MKD. The third page Page3 includes the data "Seoul", and the hardware filter 820 accordingly generates third hint information HI3 based on the comparison result. As shown in a hint information table HIT, each of first and second hint information HI1 and HI2 corresponding to the first and second pages Page1 and Page2 may have a value '0', and third hint information HI3 corresponding to the third page Page3 may have a value '1'.

The first processor 830 may control the hardware filter 820 to generate hint information. For example, to generate hint information regarding read data, the first processor 830 may provide a hint information generation command control signal to the hardware filter 820 in response to the filtering command FCMD received from the host interface 880. The first processor 830 may receive first to third hint information HI1 to HI3 from the hardware filter 820 and store the first to third hint information HI1 to HI3. The DMA 850 may communicate the first to third hint information HI1 to HI3 from the first processor 830 to the second processor 840.

The second processor 840 may store the first to third hint information HI1 to HI3, and a software filter 845 may perform a filtering operation on the first to third read data RDATA1 to RDATA3 based on the first to third hint formation HI1 to HI3. That is, referring to the first to third hint information HI1 to HI3, since data including "Seoul" that is the matching key data MKD corresponds to the third read data RDATA3, the software filter 845 may filter only the third read data RDATA3. Accordingly, the software filter 845 may provide a data request signal DRS requesting the third read data RDATA3 to the memory controller 860. The memory controller 860 may provide the third read data RDATA3 stored in the DRAM 870 to the software filter 845 in response to the data request signal DRS.

Consistent with the above-described operation, the software filter 845 need only filter the third read data RDATA3 of the first to third read data RDATA1 to RDATA3. The software filter 845 may filter the third read data RDATA3 and generate third filtered data FDATA3 obtained by filtering only row data including data "Seoul". A unit of the third filtered data FDATA3 may be defined as a record unit or "Record", later described. The software filter 845 provides the third filtered data FDATA3 to the memory controller 860 and stores the third filtered data FDATA3 in the DRAM 870. Then, the memory controller 860 may provide the third filtered data FDATA3 to the host interface 880. However, the inventive concept is not limited to only the illustrated example of FIG. 6. In another exemplary embodiment, the third filtered data FDATA3 may be provided from the second processor 840 to the host interface 880. The software filter 840 may be programmed and embodied by software. Furthermore, the software filter 840 may be embodied by a logic block.

The data processing system 800 may communicate data via the data bus 890. Furthermore, the data processing system 800 may communicate data via serial advance technology attachment (SATA), serial attached SCSI (SAS), or peripheral component interconnect express (PCIe).

FIG. 7 is a diagram illustrating one possible format for hint information HI including a bit map according to an exemplary embodiment.

Referring to FIG. 7, the hint information HI is assumed to have a data format including a bitmap of five bits. In one exemplary embodiment, the hint information HI, which serves as a partial matching indicator, may include a bit [a] indicating whether the hint information HI includes a start portion of matching key data MKD and a bit [b] indicating whether the hint information HI includes an end portion of the matching key data MKD. The hint information HI, which serves as a full matching indicator, may include a bit [c] indicating whether the hint information HI includes the whole matching key data MKD. The hint information HI, which serves as a partial matching record indicator, may include a bit [d] indicating whether a delimiter DL is present in front of the matching key data MKD and a bit [e] indicating whether a delimiter DL is present behind the matching key data MKD. In one exemplary embodiment, as shown in Table 1, the respective bits of the hint information HI may have different values depending on circumstances.

TABLE 1

| When the start portion of MKD is included/not included | [a] = 1/[a] = 0 |
| When the end portion of MKD is included/not included | [b] = 1/[b] = 0 |
| When the whole MKD is included/not included | [c] = 1/[c] = 0 |
| When a DL is present/not present in front of the included MKD | [d] = 1/[d] = 0 |
| When a DL is present/not present behind the included MKD | [e] = 1/[e] = 0 |

The hint information HI of FIG. 7 includes bits [a], [b], [c], [d], and [e] as will be described in some additional detail hereafter. However, the inventive concept is not limited to the present exemplary embodiment. For example, the order of the respective bits may be different determined, and the number of bits of the hint information H1 and a format of the hint information HI are not limited to the present exemplary embodiment.

FIGS. 8A, 8B, 8C and 8D (collectively "FIGS. 8A to 8D") are respective diagrams of hint information relative to configuration of page data (Page) corresponding to read data RDATA consistent with Table 1 above.

A page corresponding to read data RDATA may include a plurality of Records, where each Record may include various "data" and delimiters "DL" configured to separate the respective Records. A processor may refer to hint information and determine whether a filtering operation is to be simultaneously performed on respective read data corresponding to adjacent pages. Referring to FIGS. 8A to 8D, an i−1-th page (page i−1) and an i-th page (page i) are assumed to be adjacent pages, where the i−1-th page includes first, second and third records, Record1, Record2 and Record3. Record1 includes two (2) data and a delimiter DL indicating an end of Record1; Record2 includes one (1) data and a delimiter DL indicating an end of Record2; and Record3 includes one (1) data, matching key data, and a delimiter DL indicating an end of Record3.

Figure 8A:
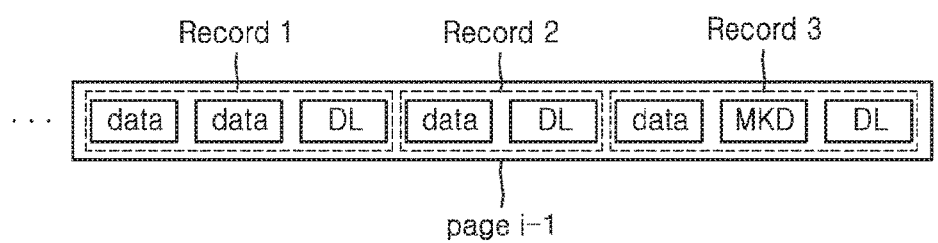

Referring to FIGS. 7 and 8A, since the whole matching key data MKD matches Record3, the bit [c] of the hint information HI will have a value of '1'. Since the delimiters DL are present before and behind the matching key data MKD included in Record3, each of the bits [d] and [e] of the hint information HI have a value of '1'. However, since the i−1-th page does not include start and end portions of the matching key data MKD, each of the bits [a] and [b] of the hint information HI will have a value of '0'. Based on the generated hint information HI, a filtering operation will be performed on i−1 read data (RDATA i−1) corresponding to the i−1-th page.

Figure 8B:
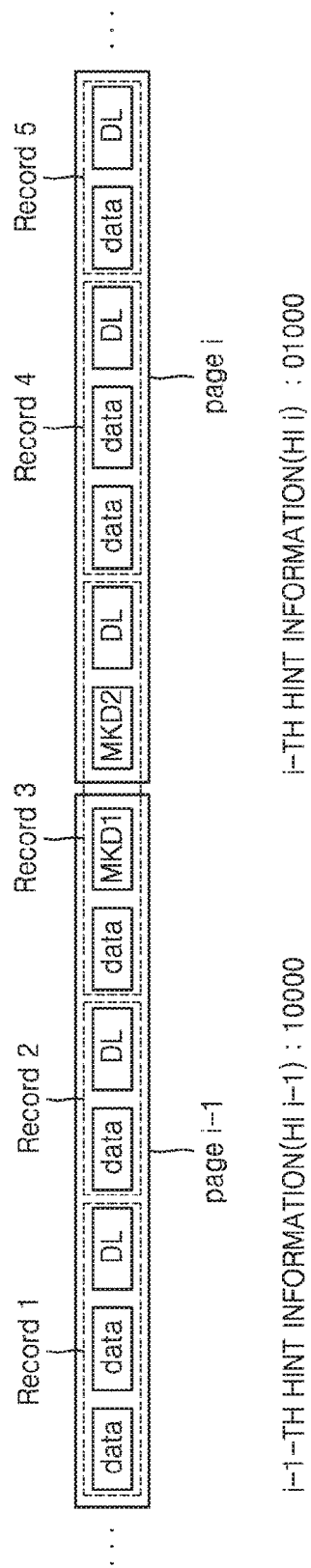

Referring now to FIGS. 7 and 8B, an i−1-th page includes Record1, Record2, and a first portion of Record3, whereas an i-th page includes a second portion of Record3, Record4, and Record5. The i−1-th page includes first matching key data MKD1, which is a start portion of matching key data MKD, in the first portion of Record3, and the i-th page includes second matching key data MKD2, which is an end portion of the matching key data MKD, in the second portion of Record3. For example, the matching key data MKD may be 'ABCDE', the first matching key data MKD1 may correspond to data including 'A' that is a start portion, and the second matching key data MKD2 may correspond to data including 'E' that is an end portion.

Since the i−1-th page includes the first matching key data MKD1, which is the start portion of the matching key data MKD, the bit [a] will have a value '1', and each of the bits [b], [c], [d], and [e] will have a value '0'. Accordingly, for the example illustrated in FIG. 8B, the i−1-th hint information HI i−1 will have a value '10000'. Since the i-th page includes the second matching key data MKD2, which is the end portion of the matching key data MKD, the bit [b] will have a value '1', and each of the remaining bits [a], [c], [d], and [e] will have a value '0'. Accordingly, the i-th hint information HI i will have a value '01000'. In this case, since it can be seen that the matching key data MKD is divided between the i−1-th page and the i-th page based on the i-th hint information HI i and the i−1-th hint information HI i−1, a filtering operation may be performed on both the i−1-th page and the i-th page simultaneously so that a user may obtain Record3 including matching key data MKD desired by a user. That is, the processor may simultaneously perform the filtering operation on i-th read data RDATA i corresponding to the i-th page and i−1-th read data RDATA i−1 corresponding to the i−1-th page based on the i-th hint information HI i and the i−1-th hint information HI i−1.

Accordingly, it may be determined whether a filtering operation is to be simultaneously performed on adjacent pages based on hint information. When matching key data MKD is divided into adjacent pages, the matching key data MKD may be obtained by filtering the adjacent pages simultaneously.

Referring now FIG. 7 and FIG. 8C, an i−1-th page again includes Record1, Record2, and a first portion of Record3, whereas an i-th page includes a second portion of Record3, Record4, and Record5. The i−1-th page includes data and matching key data MKD associated with Record3, while the i-th page includes a delimiter DL associated with Record3.

Since the i−1-th page includes the whole matching key data MKD, a bit [c] will have a value '1'. Since a delimiter DL is present in front of the matching key data MKD, a bit [d] will have a value '1'. Also, since a delimiter DL is not present behind the matching key data MKD in the portion of Record3 included in the i−1-th page, a bit [e] will have a value '0'. Thus, i−1-th hint information HI i−1 for the example illustrated in FIG. 8C will have a value '00110'.

A filtering operation may be simultaneously performed on the i−1-th page and the i-th page to obtain Record3 including the matching key data MKD as a result of the filtering operation. That is, the processor may simultaneously perform the filtering operation on i-th read data RDATA i corresponding to the i-th page and i−1-th read data RDATA i−1 corresponding to the i−1-th page based on the i−1-th hint information HI i−1.

Referring now to FIGS. 7 and 8D, since an i-th page includes the whole matching key data MKD, a bit [c] will have a value '1'. Since a delimiter DL associated with Record2 is not present in front of the matching key data MKD, a bit [d] will have a value '0'. Also, a delimiter DL is not present behind the matching key data MKD of Record3 included in the i-th page, a bit [e] will have a value '1'. Thus, i-th hint information HI i for the example illustrated in FIG. 8D will have a value '00101'.

A filtering operation may be simultaneously performed on the i−1-th page and the i-th page to obtain Record3 including the matching key data MKD as a result of the filtering operation. That is, the processor may simultaneously perform on i-th read data RDATA i corresponding to the i-th page and i−1-th read data corresponding to the i−1-th page based on the i-th hint information HI i.

Figure 9A:
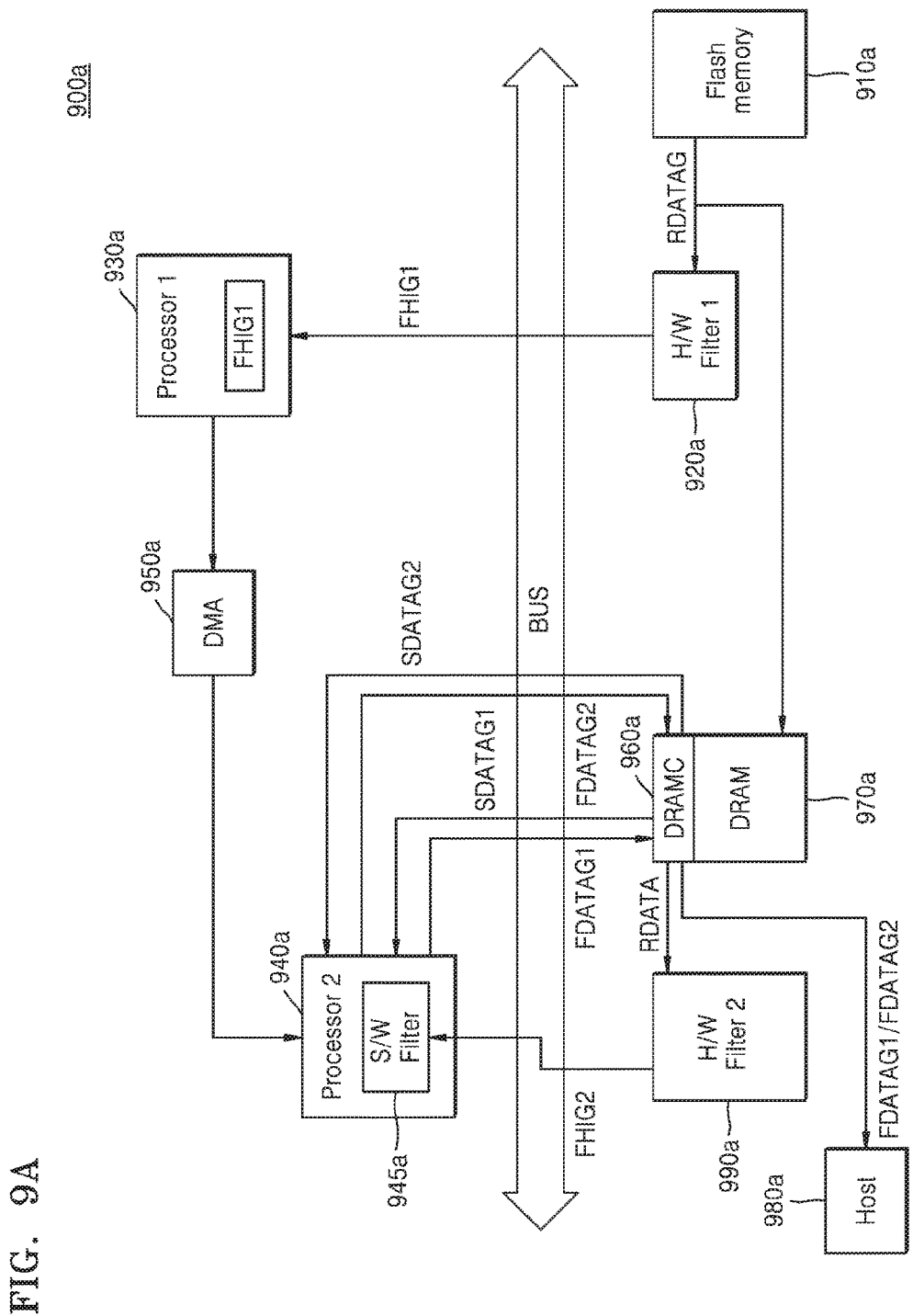
FIGS. 9A and 9B are respective conceptual diagrams illustrating operation of data processing systems according to other exemplary embodiments.
Figure 9B:
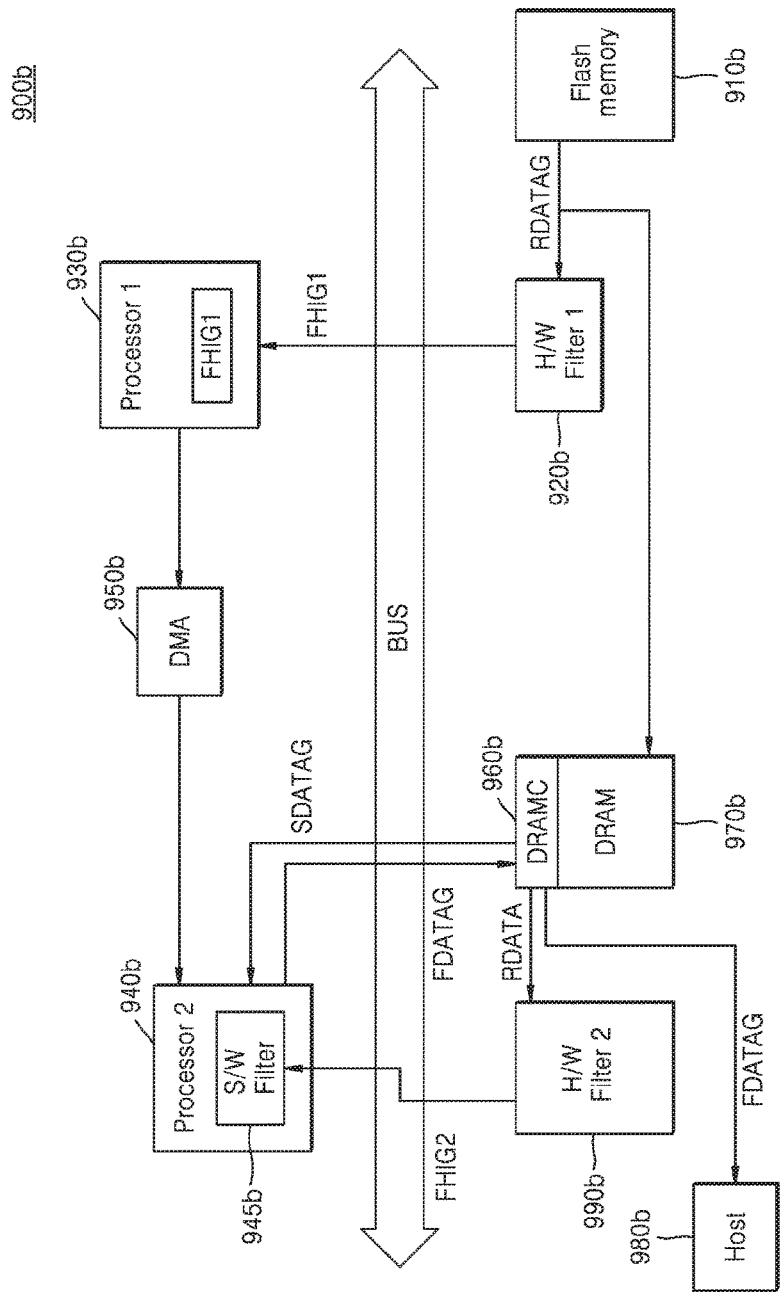

FIGS. 9A and 9B are respective conceptual diagrams illustrating operation of data processing systems according to other exemplary embodiments.

Referring to FIG. 9A, a data processing system 900a is assumed to further include a second hardware filter 990a in comparison to the data processing system 800 of FIG. 6.

A host 980a is again assumed to provide a filtering command FCMD, where filtering condition data FCD is generated based on the filtering command FCMD. The filtering condition data FCD includes matching key data MKD desired by a user. In one exemplary embodiment, the filtering condition data FCD may include at least one matching key data MKD, and a first hardware filter 920a and the second hardware filter 990a may generate hint information based on different matching key data MKD.

A flash memory 910a may provide a read data group RDATAG including a various read data to the first hardware filter 920a in response to a read command from the host 980a. Each read data may be defined according to a page unit of data that is provided in response to the corresponding read command from the host 980a. Also, the read data group RDATAG may be stored in the DRAM 970a by a memory controller 960a.

The first hardware filter 920a may receive the read data group RDATAG, compare first filter matching key data FMKD1 included in the filtering condition data FCD with the read data group RDATAG, and generate a first filter hint information group FHIG1. As described above with reference to FIG. 6, read data included in the read data group RDATAG may be compared with the first filter matching key data FMKD1 in order to generate corresponding hint information. Thus, the first filter hint information group FHIG1 may be generated.

A first processor 930a may control the first hardware filter 920a and the second hardware filter 990a to generate the first filter hint information group FHIG1 and a second filter hint information group FHIG2, respectively. For example, in response to the filtering command FCMD received from the host 980a, a first filter hint information group (FHIG1) generation command control signal and a second filter hint information group (FHIG2) generation command control signal may be respectively provided to the first hardware filter 920a and the second hardware filter 990a to generate the first filter hint information group FHIG1 and the second filter hint information group FHIG2 regarding the read data group RDATAG. The first processor 930a may receive the first filter hint information group FHIG1 from the first hardware filter 920a and store the first filter hint information group FHIG1. The DMA 950a may communicate the first filter hint information group FHIG1 from the first processor 930a to the second processor 940a.

The second hardware filter 990a may receive the read data group RDATAG from the memory controller 960a, compare second filter matching key data FMKD2 included in the filtering condition data FCD with the read data group RDATAG, and generate a second filter hint information group FHIG2. However, the inventive concept is not limited thereto, and the second hardware filter 990a may receive the read data group RDATAG from the flash memory 910a. As described above with reference to FIG. 6, read data included in the read data group RDATAG may be compared with the second filter matching key data FMKD2 in order to generate corresponding hint information. Thus, the second filter hint information group FHIG2 may be generated. The second hardware filter 990a may provide the second filter hint information group FHIG2 to the second processor 940a. However, in another exemplary embodiment, like the first hardware filter 920a, the second hardware filter 990a may provide the second filter hint information group FHIG2 through the first processor 930a to the second processor 940a.

The second processor 940a may store the first filter hint information group FHIG1 and the second filter hint information group FHIG2, and the software filter 945a may perform a filter operation on the read data group RDATAG based on store the first filter hint information group FHIG1 and the second filter hint information group FHIG2. In one exemplary embodiment, the second processor 940a may perform a filtering operation on a first selection read data group SDATAG1, which includes read data including first filter matching key data FMKD1 from among the read data group RDATAG, by referring to the first filter hint information group FHIG1. The filtering operation may be performed by the software filter 945a of the second processor 940a. Accordingly, the software filter 945a may provide a data request signal DRS requesting a first selection read data group SDATAG1 to the memory controller 960a. The memory controller 960a may provide the first selection read data group SDATAG1 stored in the DRAM 970a to the software filter 945a in response to the data request signal DRS.

Thus, the software filter 945a may filter the first selection read data group SDATAG1 and generate a first filtered data group FDATAG1.

In another exemplary embodiment, the second processor 940a may perform a filtering operation on a second selection read data group SDATAG2, which includes read data including the second filter matching key data FMKD2 from among the read data group RDATAG, by referring a second filter hint information group FHIG2. The filtering operation may be performed by the software filter 945a of the second processor 940a. Accordingly, the software filter 945a may provide a data request signal DRS requesting the second selection read data group SDATAG2 to the memory controller 960a. The memory controller 960a may provide the second selection read data group SDATAG2 stored in the DRAM 970a to the software filter 945a in response to the data request signal DRS.

Thus, the software filter 945a may filter the second selection read data group SDATAG2 and generate a second filtered data group FDATAG2.

The generated first filtered data group FDATAG1 and second filtered data group FDATAG2 may be generated to the host 980a. As a result, a user may obtain read data including first filter matching key data MKD1 or second filter matching key data MKD2. In another exemplary embodiment, ON/OFF operations of the second hardware filter 990a may be controlled by the first processor 930a.

When the second hardware filter 990a is turned OFF, a selective filtering operation may be performed by using only the first hardware filter 920a. When the second hardware filter 990a is turned ON, a selective filtering operation may be performed by using the first hardware filter 920a and the second hardware filter 990a.

Referring to FIG. 9B, in contrast to FIG. 9A, the software filter 940b receives a first filter hint information group FHIG1 and a second filter hint information group FHIG2, and performs a selective filtering operation on a selection read data group SDATAG, which includes read data including both first filter matching key data FMKD1 and second filter matching key data FMKD2, based on the first filter hint information group FHIG1 and the second filter hint information group FHIG2. The software filter 945b may provide a data request signal DRS requesting the selection read data group SDATAG to the memory controller 960b. In response to the data request signal DRS, the memory controller 960b may provide the selection read data group SDATAG stored in the DRAM 970b to the software filter 945b.

Thus, the software filter 945b may filter the selection read data group SDATAG. The software filter 945b may generate a filtered data group FDATAG by performing a selective filtering operation, and provide the generated filtered data group FDATAG to the host 980b. As a result, a user may obtain read data including both first filter matching key data MKD1 and second filter matching key data MKD2. ON/OFF operations of a second hardware filter 990b may be controlled by a first processor 930b. When the second hardware filter 990b is turned OFF, a selective filtering operation may be performed by using only a first hardware filter 920b. When the second hardware filter 990b is turned ON, a selective filtering operation may be performed by using the first hardware filter 920b and the second hardware filter 990b.

Figure 10:
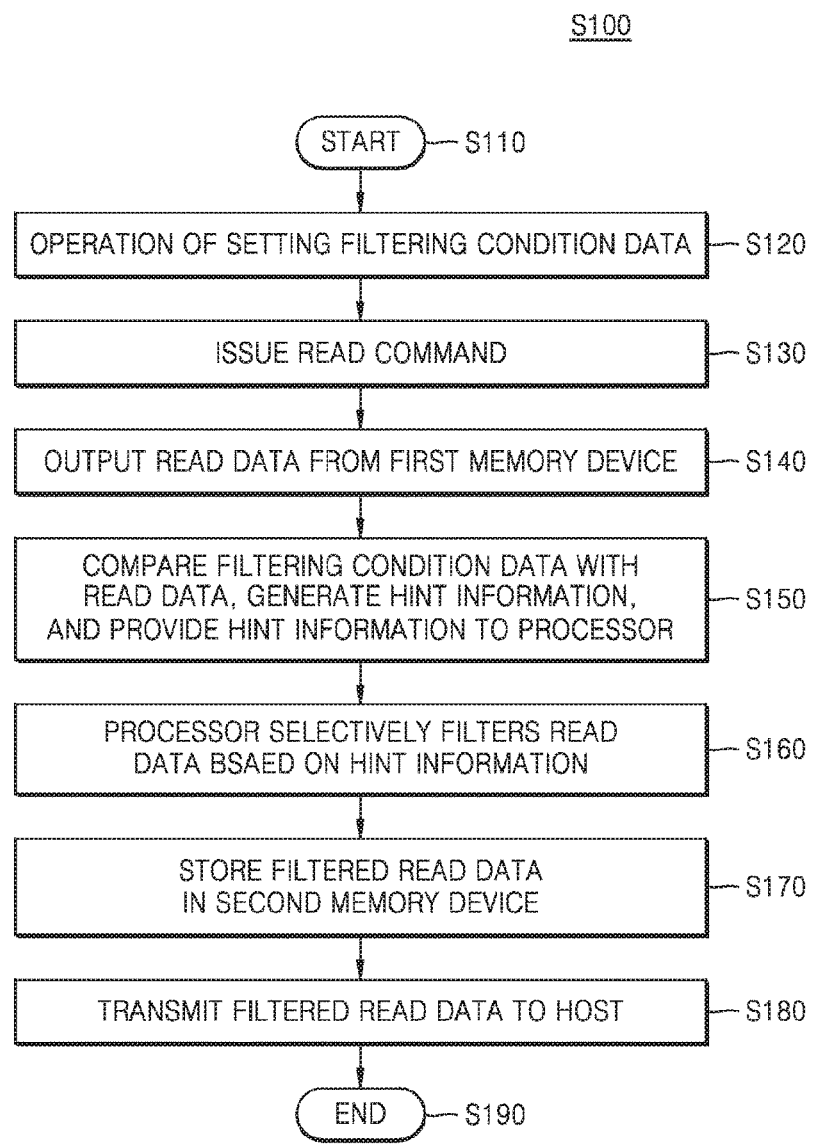
FIG. 10 is a flowchart summarizing a method of processing data according to an exemplary embodiment.

FIG. 10 is a flowchart summarizing a method S100 of processing data according to an exemplary embodiment.

Referring to FIG. 10, a data processing operation may be started (S110). An operation of setting filtering condition data in response to a filtering command FCMD from a host may be performed (S120). The filtering condition data may be generated based on the filtering command FCMD provide by the host. The filtering command FCMD may include various commands and/or queries to request information from a database. The filtering condition data may include matching key data, which is data desired by a user. Thereafter, the host may issue a read command (S130). A first memory device may provide (or output) read data in response to the read command (S140). In one exemplary embodiment, the first memory device may correspond to a secondary memory device. Thereafter, the filtering condition data may be compared with the read data, hint information may be generated based on a comparison result, and the hint information may be provided to a processor (S150). Subsequently, the processor may perform a filtering operation only on read data including matching key data included in the filtering condition data, based on the hint information (S160). Filtered read data may be generated as a result of the filtering operation, and stored in a second memory device (S170). In one exemplary embodiment, the second memory device may correspond to a primary memory device. The filtered read data may be communicated (or transmitted) to the host (S180). Subsequently, the filtering operation may be ended (S190).

Figure 11:
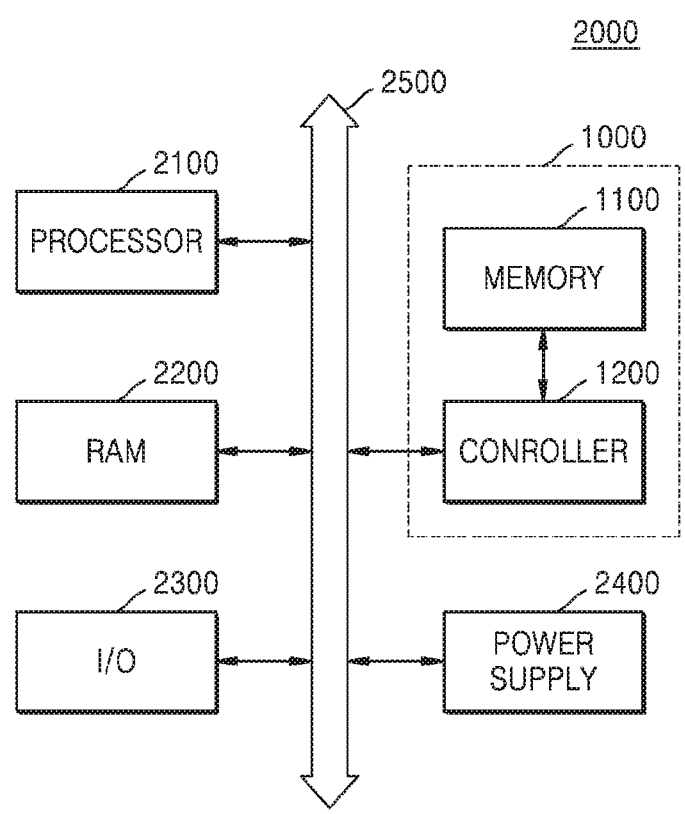
FIG. 11 is a block diagram of an electronic device including a data storage device according to exemplary embodiments.

FIG. 11 is a block diagram illustrating an electronic device 2000 including a data storage device 1000 according to exemplary embodiments.

Referring to FIG. 11, the electronic device 2000 may include a processor 2100, a RAM 2200, an input/provide (I/O) device 2300, a power device 2400, and a data storage device 1000. Meanwhile, although not shown in FIG. 11, the electronic device 2000 may further include ports that may communicate with a video card, a sound card, a memory card, or a universal serial bus (USB) device or communicate with other electronic devices. The electronic device 2000 may be embodied by a personal computer (PC) or a portable electronic device, such as a laptop computer, a portable phone, a personal digital assistant (PDA), and a camera.

The data storage device 1000 shown in FIG. 11 may be applied to the data storage device 1000 shown in FIG. 1, according to the exemplary embodiment. Accordingly, the data storage device 1000 may compare read data, which is proposed in the present inventive concept, with filtering condition data, generate hint information based on a comparison result, and perform a filtering operation based on the hint information.

The processor 2100 may perform specific calculations or tasks. In some exemplary embodiments, the processor 2100 may be a microprocessor (MP) or a central processing unit (CPU). The processor 2100 may communicate with the RAM 2200, the I/O device 2300, and the memory system 1000 via a bus 2500, such as an address bus, a control bus, or a data bus. In some exemplary embodiments, the processor 2100 may be connected to an expansion bus, such as a peripheral component interconnect (PCI) bus.

The RAM 2200 may store data required for operations of the electronic device 2000. For example, the RAM 2200 may be embodied by dynamic RAM (DRAM), mobile DRAM (MDRAM), static RAM (SRAM), phase-change RAM (PRAM), ferroelectric RAM (FRAM), resistive RAM (RRAM), and/or MRAM.

The I/O device 2300 may include an input unit, such as a keyboard, a keypad, or a mouse, and an provide unit, such as printer or a display. The power device 2400 may supply an operating voltage required for operations of the electronic device 2000.

Figure 12:
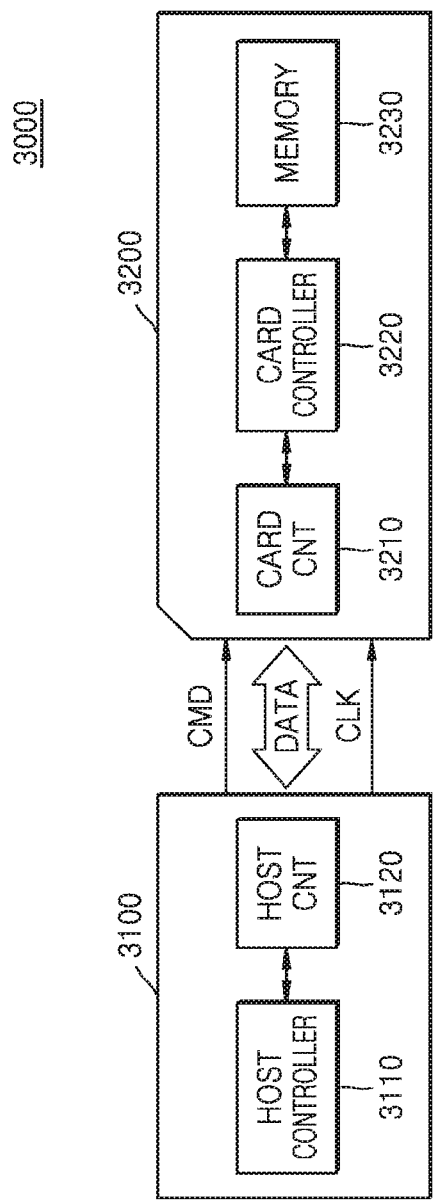
FIG. 12 is a block diagram of a memory card system including a data processing system according to exemplary embodiments.

FIG. 12 is a block diagram illustrating a memory card system 3000 including a data processing system according to exemplary embodiments.

Referring to FIG. 12, the memory card system 3000 may include a host 3100 and a memory card 3200. The host 3100 may include a host controller 3110 and a host connector 3120. The memory card 3200 may include a card connector 3210, a card controller 3220, and a memory device 3230.

The controller 310, the secondary memory device 320, and the primary memory device 330 shown in FIG. 1 may be applied to each of the card controller 3220 and the memory 3230 shown in FIG. 12.

The host system 3100 may write data to the memory card 3200 or read data stored in the memory card 3200. The host controller 3110 may communicate a command CMD, a clock signal CLK generated by a clock generator (not shown) in the host 3100, and data DATA through the host connector 3120 to the memory card 3200.

The card controller 3220 in response to a host command received through the card connector 3210 may perform a filtering operation based on hint information proposed in the inventive concept.

The memory card 3200 may be embodied by a compact flash card (CFC), a micro-drive, a smart media card (SMC), a multimedia card (MMC), a security digital card (SDC), a memory stick, a USB flash memory driver, etc.

Figure 13:
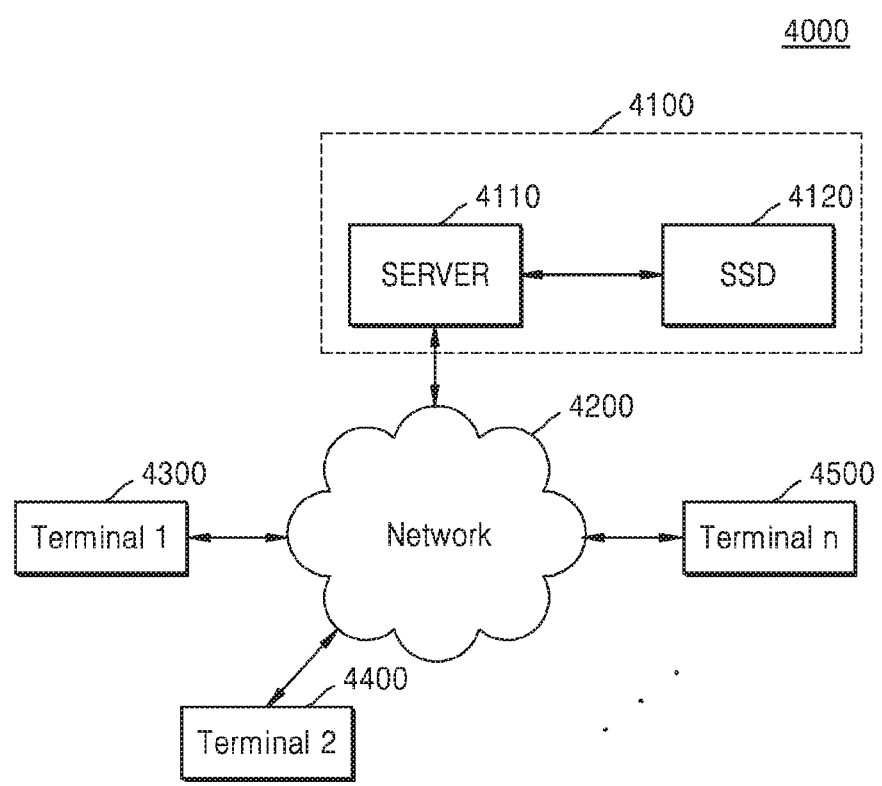
FIG. 13 is a block diagram of a network system using a server system including a solid-state drive (SSD) according to exemplary embodiments.

FIG. 13 is a block diagram illustrating a network system 4000 by using a server system 4100 including an SSD according to exemplary embodiments.

Referring to FIG. 13, the network system 4000 according to an exemplary embodiment may include the server system 4100 and a plurality of terminals 4300, 4400, and 4500, which may be connected through a network 4200. The server system 4100 according to an exemplary embodiment may include a server 4110 and an SSD 4120. The server 4110 may process a request received from the plurality of terminals 4300, 4400, and 4500 connected to the network 4200. The SSD 4120 may store data corresponding to the request received from the terminals 4300, 4400, and 4500. In this case, the data processing system 100 shown in FIG. 1 may be applied to the SSD 4120.

Meanwhile, the memory system according to one of the above-described exemplary embodiments may be mounted by using packages having various shapes. For example, the memory system according to an exemplary embodiment may be mounted by using a Package on Package (PoP) technique, a ball grid array (BGA) technique, a chip-scale package (CSP) technique, a plastic-leaded chip carrier (PLCC) technique, a plastic dual in-line package (PDIP) technique, a die-in-waffle-pack technique, a die-in-wafer-form technique, a chip-on-board (COB) technique, a ceramic dual in-line package (CERDIP) technique, a plastic metric quad flat-pack (MQFP) technique, a thin quad flat-pack (TQFP) technique, a small outline (SOIC) technique, a shrink small outline package (SSOP) technique, a thin small outline (TSOP) technique, a thin quad flatpack (TQFP) technique, a system-in-package (SIP) technique, a multi-chip package (MCP) technique, a wafer-level fabricated package (WFP) technique, or a wafer-level processed stack package (WSP) technique.

While the inventive concept has been particularly shown and described with reference to exemplary embodiments thereof, it will be understood that various changes in form and details may be made therein without departing from the scope of the following claims.

What is claimed is:

1. A data storage device, comprising:
a secondary memory device configured to provide first read data in response to a first read command;
a primary memory device configured to store the first read data received from the secondary memory system; and
a controller configured to: generate first hint information based on a result of comparison of the first read data with filtering condition data, determine whether a filtering operation is to be performed on the first read data in response to first hint information, and perform a selective filtering operation, in accordance with the first hint information, on the first read data based on the filtering condition data to generate first filtered data,
wherein the data storage device is configured to communicate the first filtered data to a host.

2. The device of claim 1, wherein the controller comprises a processor including a software filter configured to perform the selective filtering operation.

3. The device of claim 1, wherein the secondary memory device is a non-volatile memory device, and the primary memory device is a volatile memory device.

4. The device of claim 1, wherein the filtering condition data includes matching key data, and wherein the controller generates the first hint information based on whether the first read data includes at least a portion of the matching key data included in the filtering condition data.

5. The device of claim 4, wherein the first hint information comprises an address value associated with the matching key data included in the first read data.

6. The device of claim 4, wherein the controller filters the first read data in response to the first hint information indicating that the first read data includes at least a portion of the matching key data, and
the controller does not filter the first read data in response to the first hint information indicating that the first read data does not include at least a portion of the matching key data.

7. The device of claim 4, wherein the controller comprises a hardware filter configured to generate the first hint information in response to a comparison between the first read data and the filtering condition data,
the hardware filter comprising:
a register configured to store the matching key data;
a comparator configured to compare the matching key data provided by the register with the first read data to generate a comparison signal; and
a hint generator configured to generate the first hint information indicating that the first read data includes at least a portion of the matching key data in response to the comparison signal.

8. The device of claim 7, wherein the processor generates the filtering condition data based on a query provided by the host, and programs the filtering condition data in the hardware filter.

9. The device of claim 8, wherein the query is formatted according to a structured query language (SQL) or a unique query language.

10. The device of claim 4, wherein the controller comprises a hardware filter configured to generate the first hint information in response to a comparison between the first read data and the filtering condition data,
the hardware filter comprising:
a register configured to store the matching key data;
a first comparator configured to perform an integer comparison of the matching key data provided by the register and the first read data to generate a first comparison signal;
a second comparator configured to perform a Boolean comparison of the matching key data provided by the register and the first read data to generate a second comparison signal;
a third comparator configured to perform a character string comparison of the matching key data provided by the register and the first read data to generate a third comparison signal;
a logic circuit configured to generate the first hint information indicating that the first read data includes at least a portion of the matching key data in response to the first, second and third comparison signals.

11. The device of claim 1, wherein the secondary memory device provides second read data in response to a second read command,
the controller generates second hint information based on a comparison result between the second read data with the filtering condition data, and performs a selective filtering operation on the second read data based in response to the filtering condition data to generate second filtered data, and
the controller communicates the second filtered data to the host.

12. The device of claim 11, wherein the secondary memory device is a non-volatile memory device, and the first read data and the second read data are defined in page units of data.

13. A data processing system, comprising:
- a host configured to provide a read command and a filtering command; and
- a data storage device configured to receive the read command and the filtering command from the host, wherein the data storage device comprises:
  - a first memory device configured to provide first read data and second read data in response to the read command;
  - a second memory device configured to store the first read data and the second read data received from the first memory device; and
  - a controller comprising:
    - a hardware filter configured to compare the first read data with filtering condition data and to compare second read data with the filtering condition data to respectively generate first hint information and second hint information; and
    - a processor configured to perform a selective filtering operation, in accordance with the first hint information and the second hint information, on the first read data and the second read data, respectively, based on the filtering condition data to generate filtered data,
  wherein the data storage device is configured to communicate to the host the filtered data generated by the selective filtering operation.

14. The system of claim 13, wherein the first memory device is a non-volatile memory device, and
the first read data is stored in an n-th page of the first memory device, and the second read data is stored in an (n+1)-th page of the first memory device.

15. The system of claim 14, wherein the filtering condition data includes matching key data,
the hardware filter generates the first hint information indicating whether the first read data includes first matching key data, which is one part of the matching key data, and generates the second hint information indicating whether the second read data includes second matching key data, which is another part of the matching key data, and
the processor performs a filtering operation on the first read data and the second read data simultaneously based on the first hint information and the second hint information.

16. A method of operating a data processing system including a host and a data storage device, the method comprising:
- setting filtering condition data, including matching key data, in the data storage device;
- the host issuing a read command;
- in response to the read command, comparing read data stored in a secondary memory of the data storage device to the filtering condition data;
- generating hint information in response to comparing the matching key data and the read data;
- in response to the hint information, generating filtered read data by performing a filtering operation on the read data, only if the read data includes at least a portion of the matching key data; and
- communicating the filtered read data to the host.

17. The method of claim 16, wherein the setting of the filtering condition data is performed in response to a filtering command issued by the host.

18. The method of claim 17, wherein the filtering command comprises at least one of a data access command and a query requesting desired data from a database.

19. The method of claim 16, further comprising storing the filtered read data in a primary memory wherein the secondary memory comprises at least one non-volatile memory device and the primary memory comprises at least one volatile memory device.

20. The method of claim 16, wherein a hardware filter generates the hint information by:
- storing the matching key data in a register;
- a first comparator performing an integer comparison of the matching key data provided by the register as integer data and the first read data to generate a first comparison signal;
- a second comparator performing a Boolean comparison of the matching key data provided by the register and the first read data to generate a second comparison signal;
- a third comparator performing an integer comparison of the matching key data provided by the register a character string and the first read data to generate a third comparison signal;
- generating the first hint information indicating that the first read data includes at least a portion of the matching key data in response to the first, second and third comparison signals.

* * * * *